United States Patent
Kim

(10) Patent No.: US 9,392,197 B2
(45) Date of Patent: Jul. 12, 2016

(54) CAMERA MODULE

(71) Applicant: SAMSUNG ELECTRO-MECHANICS CO., LTD., Suwon (KR)

(72) Inventor: Hyun Kim, Suwon (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 64 days.

(21) Appl. No.: 13/954,381

(22) Filed: Jul. 30, 2013

(65) Prior Publication Data
US 2014/0211054 A1 Jul. 31, 2014

(30) Foreign Application Priority Data
Jan. 25, 2013 (KR) .................. 10-2013-0008532

(51) Int. Cl.
*H04N 5/335* (2011.01)
*H04N 5/369* (2011.01)
*H04N 5/225* (2006.01)

(52) U.S. Cl.
CPC ............ *H04N 5/369* (2013.01); *H04N 5/2252* (2013.01); *H04N 5/2254* (2013.01)

(58) Field of Classification Search
CPC .. H04N 5/2259; H04N 13/0282; H04N 9/097
USPC ................. 348/335, 340, 360, 164, 302, 294, 348/373–374
See application file for complete search history.

(56) References Cited

U.S. PATENT DOCUMENTS

| 2007/0058072 A1* | 3/2007 | Lee ............................. 348/342 |
| 2011/0019048 A1* | 1/2011 | Raynor et al. ................ 348/302 |
| 2011/0193968 A1 | 8/2011 | Lee |
| 2012/0057858 A1 | 3/2012 | Kobayashi |

FOREIGN PATENT DOCUMENTS

| EP | 2472853 | 7/2012 |
| JP | 2007-306282 | 11/2007 |
| KR | 10-0927002 | 11/2009 |
| KR | 10-2010-0131189 | 12/2010 |
| KR | 10-2012-0064476 | 6/2012 |

OTHER PUBLICATIONS

Korean Office Action mailed Jan. 28, 2014 in corresponding Korean Application No. 10-2013-0008532.
British Search Report dated Apr. 24, 2014 in corresponding British Patent Application No. 1320376.5.
United Kingdom Examination Report issued in counterpart United Kingdom Patent Application No. GB1320376.5 on Aug. 26, 2015 (3 pages).

\* cited by examiner

*Primary Examiner* — Twyler Haskins
*Assistant Examiner* — Carramah J Quiett
(74) *Attorney, Agent, or Firm* — NSIP Law

(57) ABSTRACT

Disclosed herein is a camera module capable of selectively using according to a mode by disposing an imaging sensor and a recognition sensor within a view angle of a lens, the camera module including: a sensor die including a silicon substrate and a sensor implemented on the silicon substrate; and a lens barrel hermetically holding the sensor die and including at least one lens, wherein the silicon substrate includes an imaging sensor and a recognition sensor implemented adjacent to each other so as to be included within a view angle of the lens.

10 Claims, 2 Drawing Sheets

CAMERA MODULE

CROSS REFERENCE(S) TO RELATED APPLICATIONS

This application claims the benefit under 35 U.S.C. Section 119 of Korean Patent Application Serial No. 10-2013-0008532, entitled "Camera Module" filed on Jan. 25, 2013, which is hereby incorporated by reference in its entirety into this application.

BACKGROUND OF THE INVENTION

1. Technical Field

The present invention relates to a camera module, and more particularly, to a camera module in which a dual sensor is disposed within a view angle of a lens.

2. Description of the Related Art

In accordance with the recent development of a technology of a portable terminal such as a cellular phone, a personal digital assistant (PDA), a tablet personal computer (PC), and the like, the portable terminal has been used as a multi-convergence such as music, a movie, a television, a game, and the like, as well as a simple phone function. The most typical product among products leading the development to the multi-convergence may be a camera module. This camera module has been developed for implementing various additional functions such as auto focusing AF and optical zoom simultaneously with evolving into high resolution cameras.

The camera module is compactly manufactured to be applied to various IT devices such as a camera phone, a PDA, a portable mobile communication device including a smart phone, or the like, and recently, a release of a device equipped with a small camera module so as to be appropriate for various tastes of customer has gradually increased.

This camera module is manufactured using an image sensor such as a CCD, a CMOS, and the like as main components and collects an image of an object through an imaging sensor so as to store as data on a memory in the device, wherein the stored data is displayed as an image through a display medium such as an LCD, a PC monitor, or the like in the device.

A camera module according to the related art is mainly configured of an image sensor module and a lens assembly, wherein the image sensor module includes an image sensor converting an image signal received from the outside into an electrical signal and a printed circuit board electrically connected to the image sensor, and the lens assembly, which hermetically holds the image sensor module, is configured of a lens barrel in which one or more lenses are coupled, a lens holder having the lens barrel received therein, and a filter.

However, the camera module according to the related art includes separate modules to be installed when imaging a subject or when recognizing a gesture of the subject, such that an installation space of the module itself may be increased and manufacturing costs may be increased.

RELATED ART DOCUMENT

Patent Document (Patent Document 1) Cited Reference: Korean Patent Laid-Open Publication No. 2012-064476

SUMMARY OF THE INVENTION

An object of the present invention is to provide a camera module capable of simultaneously performing imaging and recognition of a subject by a single module by disposing together an image sensor and a recognition sensor within a view angle of a lens.

According to an exemplary embodiment of the present invention, there is provided a camera module, including: a sensor die including a silicon substrate and a sensor implemented on the silicon substrate; and a lens barrel hermetically holding the sensor die and including at least one lens, wherein the silicon substrate includes an imaging sensor and a recognition sensor implemented adjacent to each other so as to be included within a view angle of the lens.

The imaging sensor may have a standard size relatively larger than the recognition sensor and The recognition sensor may include at least one of an ambient light sensor, a proximity sensor, and a gesture recognition sensor.

The imaging sensor may have a short side and a long side, and the recognition sensor may be disposed at one side of the long side.

The imaging sensor may be any one of a 16:9 sensor having the number of pixels (1280×720) of a high definition (HD) level having the pixel size of 1.75 μm or less and a 16:9 sensor having the number of pixels (1920×1080) of a full HD level, an optical format of the lens may include a 4:3 region, and the following equation for the recognition sensor may be satisfied.

$$\sqrt{W_r^2 + (2 \times H_r + G + H_i)^2} < R_{of}$$

$$W_r = (N_{wr}/2) \times P_r,\ H_r = (N_{hr}/2) \times P_r,\ H_i = (N_{hi}/2) \times P_i$$

wherein Nwr is the horizontal number of pixels of the recognition sensor,

Nhr is the vertical number of pixels of the recognition sensor,

Pr is a pixel pitch of the recognition sensor,

Nhi is the vertical number of pixels of the imaging sensor,

Pi is a pixel pitch of the imaging sensor,

G is a gap between the image region of the imaging sensor and the image region of the recognition sensor, and Roj is a radius of a 4:3 optical format region surrounding the image region of the imaging sensor.

The silicon substrate may include recognition sensor pads configured at a position adjacent to the recognition sensor and imaging sensor pads configured at both sides of the imaging sensor.

DESCRIPTION OF THE PREFERRED EMBODIMENTS

Hereinafter, exemplary embodiments of the present invention will be described in detail with reference to the accompanying drawings.

Figure 1:
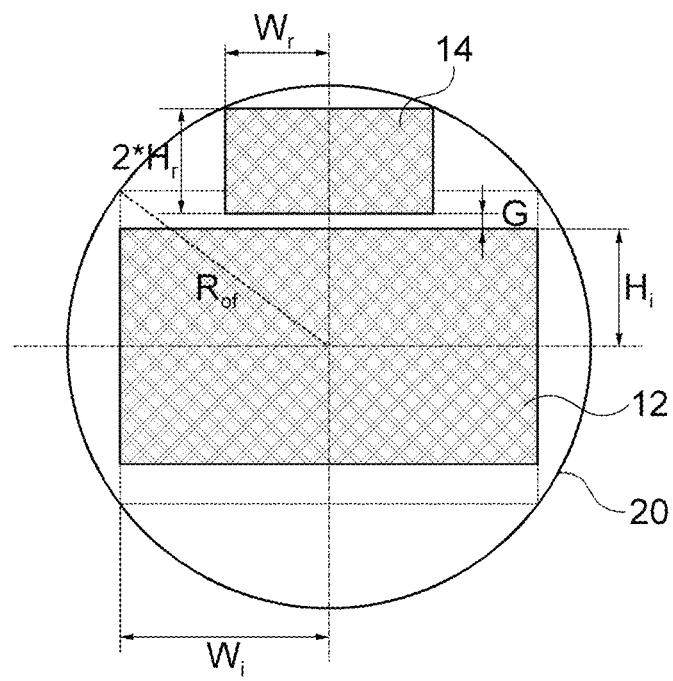
FIG. 1 is an illustration view showing a sensor arrangement and a lens view angle of a camera module according to an exemplary embodiment of the present invention.
Figure 2A:
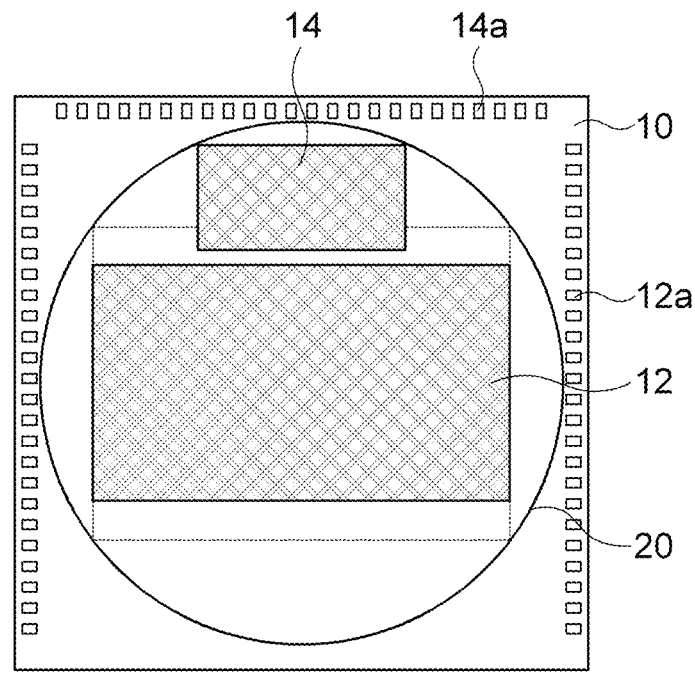
FIGS. 2A and 2B are illustration views showing a state in which recognition sensor pads and imaging sensor pads are disposed at sides of a sensor die according to an exemplary embodiment of the present invention.
Figure 2B:
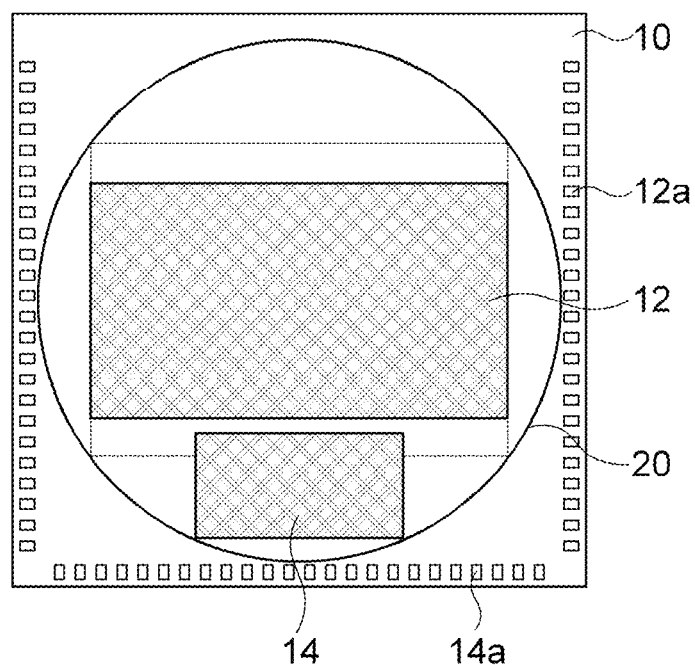

FIG. 1 is an illustration view showing a sensor arrangement and a lens view angle of a camera module according to an exemplary embodiment of the present invention, and FIGS. 2A and 2B are illustration views showing a state in which recognition sensor pads and imaging sensor pads are disposed at sides of a sensor die according to an exemplary embodiment of the present invention.

As shown, the camera module according to the exemplary embodiment of the present invention includes a sensor die and a lens installed to hermetically hold the sensor die.

The sensor die includes a silicon substrate and a sensor implemented on the silicon substrate. The sensor may include an imaging sensor and a recognition sensor.

The imaging sensor has a rectangular shape having a short side and a long side and may be installed at a central portion of the silicon substrate so that it may be disposed on the same axis line as the center of the lens. This imaging sensor serves to sense an image of a subject when taking a still picture or a moving picture.

In addition, as the imaging sensor, a 16:9 sensor having the number of pixels of 1280×720 of a high definition (HD) level having a pixel size of 1.75 μm or less or a 16:9 sensor having the number of pixels of 1920×1080 of a full HD level may be used.

In this case, the lens may employ a 4:3 optical format according to a standard size of the imaging sensor employing a 16:9 image sensor.

In addition, as the recognition sensor, an ambient light sensor sensing an illumination of light, a proximity sensor, and a gesture recognition sensor recognizing a gesture of the subject, or the like may be applied. This recognition sensor is disposed adjacent to the imaging sensor so as to be located within a view angle of the lens.

In addition, the recognition sensor has a standard size relatively smaller than the imaging sensor. This is because the recognition sensor is disposed at the remaining space except for the imaging sensor within the view angle of the lens when disposing in the view angle of the lens, that is, a position adjacent to a long side of the imaging sensor.

Meanwhile, FIG. 1 shows a state in which the imaging sensor and the recognition sensor are disposed within the view angle of the lens.

Wi and Hi each represent a half of horizontal width and a half of vertical height of an image region of the imaging sensor having a 16:9 format.

On the other hand, Wr and Hr each represent a half of horizontal width and a half of vertical height of an image region of the recognition sensor.

In addition, G represents a space between the image region of the recognition sensor and the image region of the imaging sensor, and Roj represents a radius of a 4:3 format region (a half of a diagonal length) indicated by a dot line around the image region of the imaging sensor.

Here, an optical format of a sensor is commonly defined as a value that a diagonal length of the image region of the sensor is divided by 18 as mm units. For example, in the case of a HD level sensor having the number of pixels of 1280×720 having a pixel size of 1.75 μm, the optical format of the sensor is calculated as 2.57/18=1/7 inch.

In the present invention, in the case in which the imaging sensor according to the present invention is any one of the 16:9 sensor having the number of pixels (1280×720) of the HD level having the pixel size of 1.75 μm or less and the 16:9 sensor having the number of pixels (1920×1080) of the full HD level, and the optical format of the lens is configured of a 4:3 region, the following equation for the recognition sensor may be satisfied.

$$\sqrt{W_r^2 + (2 \times H_r + G + H_i)^2} < R_{of}$$

$$W_r = (N_{wr}/2) \times P_r, \ H_r = (N_{hr}/2) \times P_r, \ H_i = (N_{hi}/2) \times P_i \quad \text{[Equation 1]}$$

Nwr is the horizontal number of pixels of the recognition sensor.

Nhr is the vertical number of pixels of the recognition sensor.

Pr is a pixel pitch of the recognition sensor.

Nhi is the vertical number of pixels of the imaging sensor.

Pi is a pixel pitch of the imaging sensor.

G is a gap between the image region of the imaging sensor and the image region of the recognition sensor.

Roj is a radius of a 4:3 optical format region surrounding the image region of the imaging sensor.

As an exemplary embodiment with reference to the described equation, when the recognition sensor has the number of pixel of 100×100 and the imaging sensor has the number of pixels of the HD level having the pixel pitch of 1.75 μm, the pixel pitch of the recognition sensor is predicted by the following equation.

$$\sqrt{((100/2) \times P_r)^2 + (100 \times P_r + 0.1 + 0.63)^2} < 1.4$$

In this case, $h_i$ is 0.63 mm and $R_{of}$ of the 4:3 optical format is 1.4 mm.

More specifically, the pixel pitch $P_i$ of the imaging sensor is 1.75 μm and the vertical number of pixels $N_{hi}$ of the imaging sensor of the HD level (1280×720) is 720. Therefore, $H_i$= (720/2)*1.75 μm=630 μm=0.63 mm may be obtained.

In addition, the gap G is 100 μm=0.1 mm, and the vertical number of pixels $N_{hr}$ of the recognition sensor of 100×100 pixel level is 100. Therefore, $H_r = (100/2) * P_r \rightarrow 2 * H_r = 100 * P_r$.

In addition, the horizontal number of pixels $N_{wr}$ of the recognition sensor of 100×100 pixel level is 100. Therefore, $W_r = (100/2) * P_r$.

Next, $R_{of}$ of the 4:3 optical format region including the imaging sensor of the number of pixels of the HD level is calculated as followings. The horizontal width is 1280×1.75 μm=2240 μm=2.24 mm and the vertical height is 960×1.75 μm=1680 μm=1.68 mm. Therefore, the diagonal length of the 4:3 region is 2.8 mm and $R_{of}$ is 1.4 mm which is a half of the diagonal length.

Here, in the case of the 16:9 sensor, the vertical number of pixels is 1280*9/16=720 and in the case of the 4:3 sensor, the vertical number of pixels is 1280*3/4=960.

Therefore, it may be appreciated that the recognition sensor has the pixel pitch $P_r$ of maximum 6.3 μm from the above equation.

On the other hand, when the number of pixel is determined in a state in which the pixel pitch of the recognition sensor is first fixed by prioritizing an image quality performance under low illumination, the number of pixels may be calculated by the following equation.

That is, when the pixel pitch of the recognition sensor is fixed to 10 μm, the number of pixels is calculated by $$\sqrt{((N_{wr}/2) \times 0.01)^2 + (N_{hr} \times 0.01 + 0.1 + 0.63)^2} < 1.4.$$

In this case, for convenience of calculation, when solving the above equation by assuming that Nwr and Nhr are the same value as each other, it may be appreciated that the recognition sensor has the number of pixels of maximum 63×63.

In addition, as another exemplary embodiment, when the recognition sensor has the number of pixels of 100×100 and the imaging sensor has the number of pixels of the HD level having the pixel pitch of 1.4 μm, the pixel pitch of the recognition sensor may be calculated by the following equation.

$$\sqrt{((100/2) \times P_r)^2 + (100 \times P_r + 0.1 + 0.504)^2} < 1.12$$

When solving the above equation, it may be appreciated that the recognition sensor has the pixel pitch $P_r$ of maximum 4.8 μm.

On the other hand, when the number of pixel is determined in a state in which the pixel pitch of the recognition sensor is first fixed by prioritizing the image quality performance under low illumination, the number of pixels may be calculated by the following equation.

When the pixel pitch of the recognition sensor is fixed to 10 μm, the number of pixels is calculated by the following equation.

$$\sqrt{((N_{wr}/2) \times 0.01)^2 + (N_{hr} \times 0.01 + 0.1 + 0.504)^2} < 1.12$$

For convenience of calculation, when solving the above equation by assuming that Nwr and Nhr are the same value as each other, it may be appreciated that the recognition sensor has the number of pixels of a maximum of 48×48.

In addition, as still another exemplary embodiment, when the recognition sensor has the number of pixels of 100×100 and the imaging sensor has the number of pixels of the full HD level having the pixel pitch of 1.75 μm, the pixel pitch of the recognition sensor may be calculated by the following equation.

In this case, $H_i$ is 0.945 mm and $R_{of}$ of the 4:3 optical format is 2.1 mm. In this case, a value of $H_i$ and a value of $R_{of}$ may be calculated by the same solving process as the above-mentioned embodiments.

$$\sqrt{((100/2) \times P_r)^2 + (100 \times P_r + 0.1 + 0.945)^2} < 2.1$$

When solving the above equation, it may be appreciated that the pixel pitch $P_r$ of the recognition sensor is a maximum of 9.9 μm and thus is relatively larger than the case of having the number of pixels of the HD level.

This is because the size of the 4:3 optical format of 2.1 mm in the case of the imaging sensor having the number of pixels of the full HD level is relatively larger than the size of the 4:3 optical format of 1.4 mm in the case of the imaging sensor having the number of pixels of the HD level.

In addition, as still another exemplary embodiment, when the recognition sensor has the number of pixels of 100×100 and the imaging sensor has the number of pixels of the full HD level having the pixel pitch of 1.4 μm, the pixel pitch of the recognition sensor may be calculated by the following equation.

$$\sqrt{((100/2) \times P_r)^2 + (100 \times P_r + 0.1 + 0.756)^2} < 1.68$$

When solving the above equation, it may be appreciated that the recognition sensor has the pixel pitch $P_r$ of a maximum of 7.8 μm.

On the other hand, when the number of pixels is determined in a state in which the pixel pitch of the recognition sensor is first fixed by prioritizing an image quality performance under low illumination, the number of pixels may be calculated by the following equation.

When the pixel pitch of the recognition sensor is fixed to 10 μm, the number of pixels is calculated by $$\sqrt{((N_{wr}/2) \times 0.01)^2 + (N_{hr} \times 0.01 + 0.1 + 0.756)^2} < 1.68.$$

For convenience of calculation, when solving the above equation by assuming that Nwr and Nhr are the same value as each other, it may be appreciated that the recognition sensor has the number of pixels of a maximum of 78×78.

Similar to the above result that the imaging sensor having the pixel pitch of 1.75 μm is assumed, it may be appreciated that when selecting the full HD level as the number of pixels of the imaging sensor having the pixel pitch of 1.4 μm, the number of pixels of the recognition sensor larger than that of the sensor having the number of pixels of the HD level may be obtained, but the region of the 4:3 optical format becomes approximately two times larger.

The following table summarizes the calculations of the pixel pitch of the recognition sensor in the different embodiments as described above.

An imaging sensor having the pixel pitch of 1.12 μm is also included in the following table. This is because the size of the imaging sensor is gradually decreased in accordance with the evolution of a technology.

TABLE 1

| Pixel Pitch of Imaging Sensor | Size of Image Region for Imaging Sensor | | Pixel Pitch of Recognition Sensor (Resolution: 100 × 100 pixels) | |
|---|---|---|---|---|
| | HD Resolution | Full HD Resolution | HD Imaging Sensor | Full HD Imaging Sensor |
| 1.75 μm | 2.24 mm × 1.26 mm ($R_{of}$ = 1.4 mm) | 3.36 mm × 1.89 mm ($R_{of}$ = 2.1 mm) | Max 6.3 μm (Imaging Pitch × 3.6) | Max 9.9 μm (Imaging Pitch × 5.66) |
| 1.4 μm | 1.792 mm × 1.008 mm ($R_{of}$ = 1.12 mm) | 2.688 mm × 1.512 mm ($R_{of}$ = 1.68 mm) | Max 4.8 μm (Imaging Pitch × 3.4) | Max 7.8 μm (Imaging Pitch × 5.5) |
| 1.12 μm | 1.4336 mm × 0.806 mm ($R_{of}$ = 0.896 mm) | 2.15 mm × 1.2096 mm ($R_{of}$ = 1.4 mm) | Max 3.7 μm (Imaging Pitch × 3.3) | Max 6.0 μm (Imaging Pitch × 5.35) |

In order to more improve the performance of the recognition sensor under the low illumination, it is more advantageous to maintain F-number of the lens (a value dividing a focus length of the lens by an effective aperture of the lens) to be lower. That is, it may be required to increase the effective aperture of the lens to allow more light amount to be incident to the recognition sensor.

As shown in Table 1, in the case in which the pixel pitch of the imaging sensor of the HD level is 1.12 μm, the pixel pitch of the recognition sensor having the number of pixels of 100×100 may have the maximum value of 3.7 μm. In this case, it may be appreciated that the low F-number of the lens is advantageous to secure a recognition performance under the low illumination.

Currently, the F-number of the lens of the camera module for a mobile is generally larger than 2.0, but the lens having the F-number of 2.0 or less may be more suitable for the object of the present invention.

Meanwhile, FIGS. 2A and 2B are illustration views showing a state in which recognition sensor pads and imaging sensor pads are disposed at sides of a sensor die according to an exemplary embodiment of the present invention.

As shown, the imaging sensor may be disposed at the central portion of a silicon substrate and the recognition sensor may be disposed at an upper or lower side of the imaging sensor.

In addition, the silicon substrate may be provided with the imaging sensor pads and the recognition sensor pads so as to electrically connect to a printed circuit board of the camera module.

That is, the imaging sensor pads are formed at both sides of the imaging sensor and the recognition sensor pads are formed at a place adjacent to a position of the recognition sensor, such that the imaging sensor pads and the recognition sensor pads may be coupled by electrically connecting to the printed circuit board.

The camera module according to the exemplary embodiment of the present invention may selectively image and recognize the subject by the single module by disposing together the imaging sensor and the recognition sensor within the view angle of the lens, thereby making it possible to decrease manufacturing costs and manufacture a more slim and compact camera module.

In addition, the camera module according to the exemplary embodiment of the present invention may be used in the low illumination environment while not using the IR light source.

Although the camera module according to the exemplary embodiments of the present invention has been described, the present invention is not limited thereto, but those skilled in the art will appreciate that various applications and modifications are possible.

What is claimed is:

1. A camera module, comprising:
   a sensor die comprising a silicon substrate and a sensor implemented on the silicon substrate; and
   a lens barrel hermetically holding the sensor die and comprising at least one lens,
   the silicon substrate comprising an imaging sensor and a recognition sensor implemented adjacent to each other so as to be included within a view angle of the lens,
   wherein the imaging sensor is any one of a 16:9 sensor having the number of pixels (1280×720) of a high definition (HD) level having the pixel size of 1.75 μm or less and a 16:9 sensor having the number of pixels (1920×1080) of a full HD level, an optical format of the lens comprises a 4:3 region, and the following equation for the recognition sensor is satisfied:

$$\sqrt{W_r^2 + (2 \times H_r + G + H_i)^2} > R_{of}$$

$$W_r = (N_{wr}/2) \times P_r, \quad H_r = (N_{hr}/2) \times P_r, \quad H_i = (N_{hi}/2) \times P_i$$

wherein Nwr is the horizontal number of pixels of the recognition sensor,

Nhr is the vertical number of pixels of the recognition sensor,

Pr is a pixel pitch of the recognition sensor,

Nhi is the vertical number of pixels of the imaging sensor,

Pi is a pixel pitch of the imaging sensor,

G is a gap between the image region of the imaging sensor and the image region of the recognition sensor, and Roj is a radius of a 4:3 optical format region surrounding the image region of the imaging sensor.

2. The camera module according to claim 1, wherein in response to the recognition sensor having the number of pixels of 100×100 and the imaging sensor having the number of pixels of the HD level having the pixel pitch of 1.75 μm, the pixel pitch of the recognition sensor is calculated by $$\sqrt{((100/2) \times P_r)^2 + (100 \times P_r + 0.1 + 0.63)^2} < 1.4.$$

3. The camera module according to claim 2, wherein in response to the pixel pitch of the recognition sensor being fixed to 10 μm, the number of pixels is calculated by $$\sqrt{((N_{wr}/2) \times 0.01)^2 + (N_{hr} \times 0.01 + 0.1 + 0.63)^2} < 1.4.$$

4. The camera module according to claim 1, wherein in response to the recognition sensor having the number of pixels of 100×100 and the imaging sensor having the number of pixels of the HD level having the pixel pitch of 1.4 μm, the pixel pitch of the recognition sensor is calculated by $$\sqrt{((100/2) \times P_r)^2 + (100 \times P_r + 0.1 + 0.504)^2} < 1.12.$$

5. The camera module according to claim 4, wherein in response to the pixel pitch of the recognition sensor being fixed to 10 μm, the number of pixels is calculated by $$\sqrt{((N_{wr}/2) \times 0.01)^2 + (N_{hr} \times 0.01 + 0.1 + 0.504)^2} < 1.12.$$

6. The camera module according to claim 1, wherein in response to the recognition sensor having the number of pixels of 100×100 and the imaging sensor having the number of pixels of the full HD level having the pixel pitch of 1.75 µm, the pixel pitch of the recognition sensor is calculated by $$\sqrt{((100/2) \times P_r)^2 + (100 \times P_r + 0.1 + 0.945)^2} < 2.1.$$

7. The camera module according to claim 1, wherein in response to the recognition sensor having the number of pixels of 100×100 and the imaging sensor having the number of pixels of the full HD level having the pixel pitch of 1.4 µm, the pixel pitch of the recognition sensor is calculated by $$\sqrt{((100/2) \times P_r)^2 + (100 \times P_r + 0.1 + 0.756)^2} < 1.68.$$

8. The camera module according to claim 7, wherein in response to the pixel pitch of the recognition sensor being fixed to 10 µm, the number of pixels is calculated by $$\sqrt{((N_{wr}/2) \times 0.01)^2 + (N_{hr} \times 0.01 + 0.1 + 0.756)^2} < 1.68.$$

9. The camera module according to claim 1, wherein the silicon substrate comprises recognition sensor pads configured at a position adjacent to the recognition sensor and imaging sensor pads configured at both sides of the imaging sensor.

10. The camera module according to claim 1, wherein the lens has F-number of 2.0 or less.

\* \* \* \* \*